UNITED STATES PATENT OFFICE.

WILLIAM L. VOELKER, OF ELIZABETH, NEW JERSEY, ASSIGNOR TO THE CONSOLIDATED STERLING INCANDESCENT GAS LAMP COMPANY, OF NEW JERSEY.

PROCESS OF MANUFACTURING HOODS OR MANTLES FOR INCANDESCENT GAS-BURNERS.

SPECIFICATION forming part of Letters Patent No. 571,419, dated November 17, 1896.

Application filed May 22, 1896. Serial No. 592,664. (No specimens.)

*To all whom it may concern:*

Be it known that I, WILLIAM L. VOELKER, a citizen of the United States, and a resident of Elizabeth, Union county, State of New Jersey, have invented certain new and useful Improvements in Processes of Manufacturing Hoods or Mantles for Incandescent Gas-Lights, of which the following is a specification.

This invention relates to a process of manufacturing hoods or mantles for incandescent gas-lights. In particular it aims to provide a process by which hoods or mantles that are formed of suitable incandescible materials may be baked in a manner to procure uniform results with respect to shrinkage and tenacity of the hoods and the form of the same.

The process depends upon a discovery which I have made that if a hood or mantle, after being dried sufficiently to stand without collapsing, is plunged into an atmosphere which is heated to a very high temperature, as, say, from 3,500° to 4,000° Fahrenheit, the hood will be baked without perceptible distortion of its form and with uniform tenacity and strength in all parts of the hood. The temperature also should be higher than that to which the mantle or hood will be subjected when in use over a gas-burner, for then the gas-flame will not exert any perceptible destructive action on the hood or mantle.

In order to explain the difference between my invention and the method of baking hoods heretofore employed, I will first explain the method by which usually the hoods have been baked. This method consists in placing hoods or mantles in large quantities at a time in a kiln or oven before the oven has been heated to its final degree, and even in the oven when cold. The oven is filled with the hoods and mantles and their supports or holders, which holders are stuck into flat fire-clay slabs, layer upon layer of these slabs being placed in the oven until the same is filled. The oven-doors are then closed, the firing started up, and the temperature allowed to rise to the desired degree. The source of heat is then shut off, the oven allowed to cool, and the hoods or mantles removed. This process closely follows that used by potters in baking their wares. By it no two bakings will be alike, nor will the hoods of any two layers of the same baking be alike either in dimensions, height, form, or hardness and strength of material. The variations of dimension and height are due to the different degrees of temperature in the different parts of the oven. Symmetry of form of the hoods is governed by equal distribution of the mass in all parts of the hood, but, for well-known reasons, this equal distribution of the mass is practically impossible, and under the existing method of baking, as this distribution varies, so will the baked mantle vary from a symmetrically perfect form to one distorted in accordance with the inequalities of the distribution of the material. The hoods baked on the pottery principle show these imperfections in a marked degree, because this is a slow process of baking and tends to aggravate and exaggerate the imperfections in the distribution of the mass.

I, however, have discovered that if a hood or mantle is first dried sufficiently to stand without collapsing and is then plunged at once into a highly-heated atmosphere as, say, from 3,500° to 4,000° Fahrenheit, and kept there for a few minutes, the result is an entirely superior structure, for under these circumstances the hood bakes so quickly that it has not time to develop the imperfections due to the unequal distribution of the mass, and, moreover, the considerable pressure of the highly-heated atmosphere exerted evenly on all sides of the hood prevents the developing of the inequalities in the form of the hood, even if such inequalities should tend to be developed. Thus by my process I am able to produce hoods which are almost perfect in form and tenacity and which can be duplicated every few minutes in the day. The process in detail is as follows: Hoods to the number of twenty-five or thirty, having been first sufficiently dried, and of the usual shape, are preferably suspended on the tops of the fire-clay rods. This suspension is especially desirable if the materials of which the hoods are composed shrink much in the baking. When, however, the materials of the hood do not shrink perceptibly in baking the hoods may be supported on their bottoms on suitable slabs, as slabs of nickel. The said rods (if such are used) are placed upright in holes that are bored in a flat fire-clay slab. The slabs with their rods and hoods are then placed in the oven of any suitable furnace (for example, such as those used for melting platinum) that will generate and stand the intense heat necessary, the oven having been first heated to about 3,500° to 4,000° Fahrenheit.

When the first batch of mantles is to be baked, after the oven is first heated up, the door is opened for a short time, say half a minute. In this short time the great pressure in the oven momentarily vents itself before the mantles are brought near, so that danger of shattering the mantles is obviated; but the temperature of the oven is not perceptibly lowered by the opening of the door for so short a time, so that when the mantles are introduced into the oven and the door closed the pressure almost immediately rises again to a very high degree. After the first batch of hoods is baked the momentary opening of the door for taking out one batch and introducing the next batch of mantles is sufficient to momentarily vent the pressure so as to prevent injury to the hoods. The shape and size of the oven should be such that the interior space shall be just sufficient to hold one slab of hoods with the least possible vacant space. The heated atmosphere, which is at a high pressure proportional to its temperature and passes freely into the interior of the hoods through the meshes thereof, then comes on both the inside and the outside of the hoods with a pressure that resembles in its effects the pressure of an enveloping mold or die. This pressure preserves the uniformity of the hoods, prevents distortion, and, together with the intense temperature of the oven and the consequent rapid baking of the hood, insures a uniformity of strength and tenacity throughout the material of the hood.

Now, having described my improvement, I claim as my invention—

The process hereinbefore described of manufacturing hoods or mantles for incandescent gas-lights consisting in partially drying the hood or mantle, and then introducing it into a closed furnace and there exposing it at once to an intense temperature, whereby the hot air of the furnace acts as a die on the hood or mantle, and the same bakes before it can distort.

In testimony that I claim the foregoing as my invention I have signed my name, in presence of two witnesses, this 12th day of May, 1896.

WILLIAM L. VOELKER.

Witnesses:
  GLENN FORD MCKINNEY,
  HENRY V. BROWN.